United States Patent
Spagnuolo et al.

(10) Patent No.: US 7,004,485 B2
(45) Date of Patent: Feb. 28, 2006

(54) STEERING LINK WITH BUCKLE PORTION

(75) Inventors: Steven P. Spagnuolo, Maryville, TN (US); Glenn G. Nief, Loudon, TN (US)

(73) Assignee: Koyo Steering Systems of North America, Inc., Plymouth, MI (US)

( * ) Notice: Subject to any disclaimer, the term of this patent is extended or adjusted under 35 U.S.C. 154(b) by 0 days.

(21) Appl. No.: 10/092,699

(22) Filed: Mar. 7, 2002

(65) Prior Publication Data

US 2003/0168826 A1  Sep. 11, 2003

(51) Int. Cl.
*B62D 7/16* (2006.01)

(52) U.S. Cl. .................... 280/93.51; 403/122

(58) Field of Classification Search ............ 280/93.51, 280/93.514, 777; 188/371, 376; 293/133; 403/122, 124, 125, 126, 131
See application file for complete search history.

(56) References Cited

U.S. PATENT DOCUMENTS

| | | | | |
|---|---|---|---|---|
| 4,162,859 A | * | 7/1979 | McAfee | 403/75 |
| 4,334,693 A | * | 6/1982 | Huber | 280/124.143 |
| 4,887,486 A | * | 12/1989 | Wood, Jr. | 74/588 |
| 5,141,248 A | * | 8/1992 | Haldric et al. | 280/777 |
| 5,697,478 A | * | 12/1997 | Di Stefano | 188/371 |
| 5,853,194 A | * | 12/1998 | Baker et al. | 280/777 |
| 6,234,704 B1 | | 5/2001 | Sukigara et al. | |
| 6,298,962 B1 | * | 10/2001 | Kato et al. | 188/371 |
| 6,402,168 B1 | * | 6/2002 | Chino et al. | 280/86.758 |

* cited by examiner

*Primary Examiner*—David R. Dunn

(57) ABSTRACT

A vehicle steering linkage member (40) comprises a socket (42), and a stud (10) having a ball end portion (48) received in the socket and supported for pivotal movement relative to the socket. The stud (10) has a longitudinal axis (52), with a shank portion (50) projecting from the socket (42) and centered on the axis. The shank portion (50) of the ball stud (10) includes a predetermined weakened portion (70). The predetermined weakened portion (70) buckles under a predetermined amount of force. The predetermined weakened portion (70) may have a cross-sectional configuration not centered on the axis (52).

17 Claims, 2 Drawing Sheets

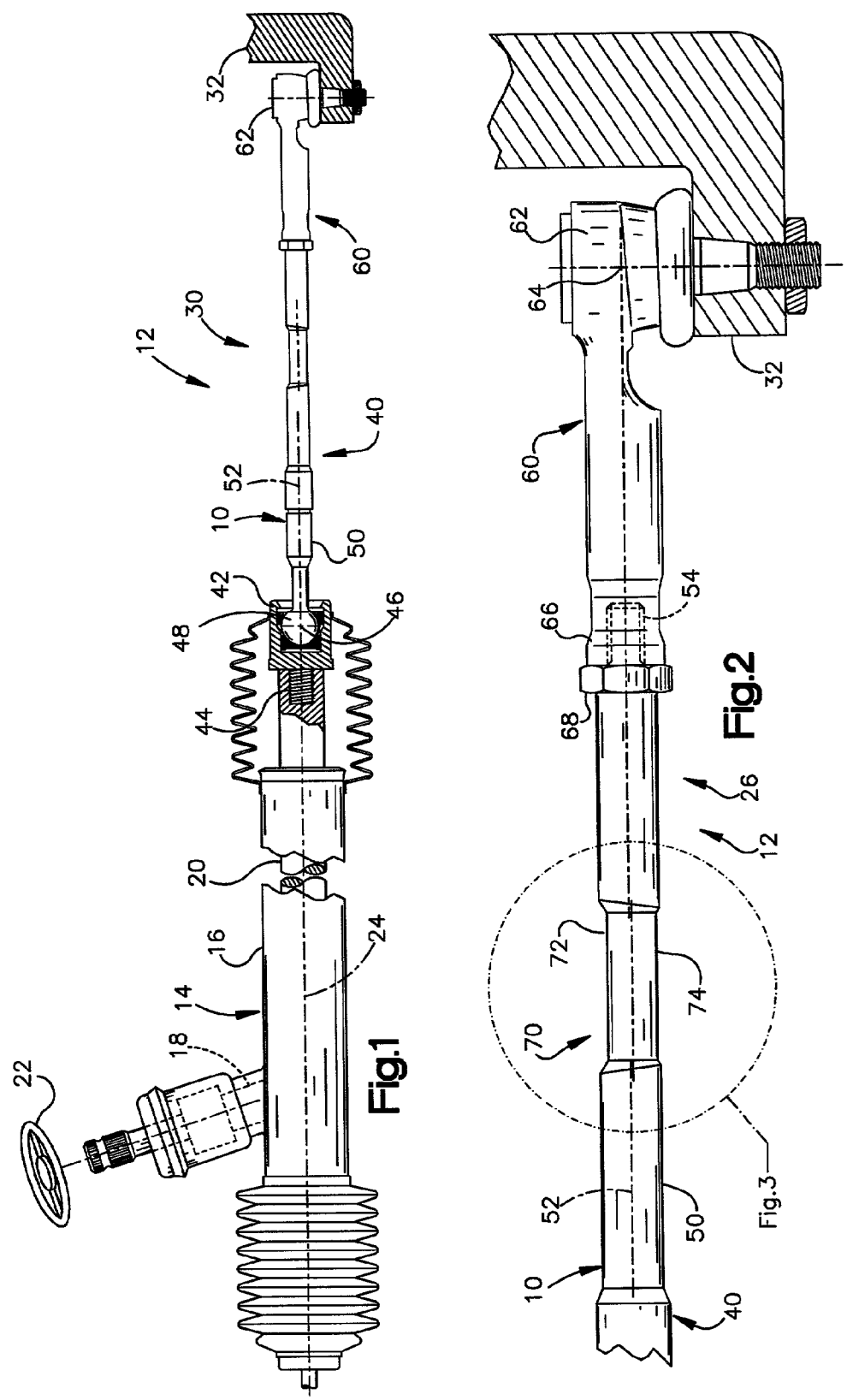

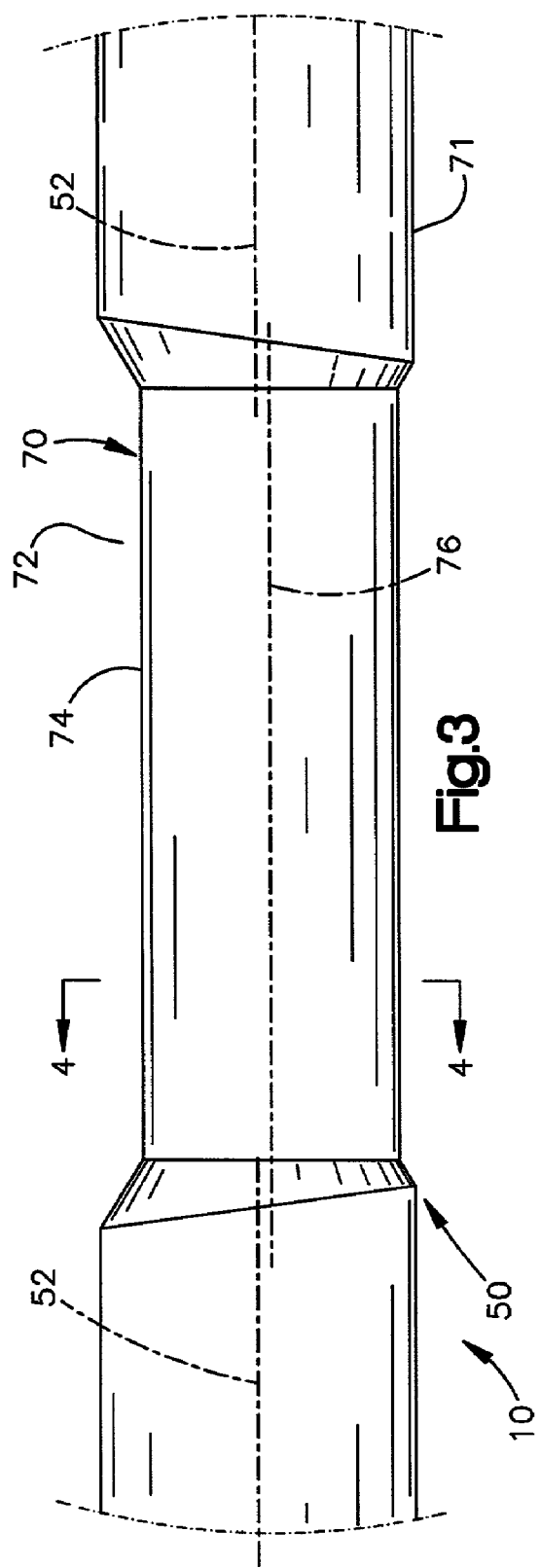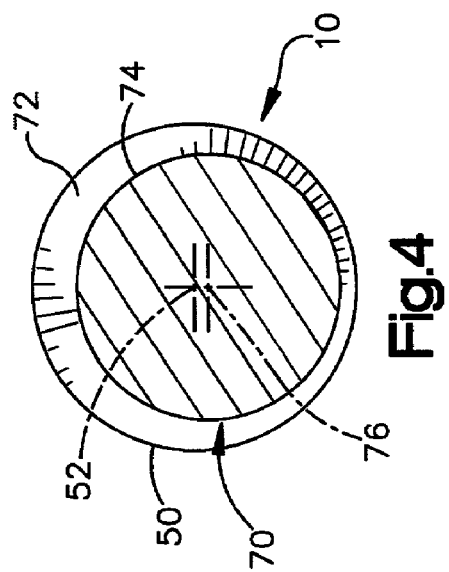

STEERING LINK WITH BUCKLE PORTION

BACKGROUND OF THE INVENTION

1. Technical Field

The present invention relates to a vehicle steering link having a portion that is designed to buckle under a predetermined axial load, to prevent damage to the vehicle steering gear.

2. Description of the Prior Art

A vehicle steering linkage includes one or more links that connect the steering gear with the steerable wheels of the vehicle. For example, a vehicle having a rack and pinion steering gear includes, at each end of the rack, an inner tie rod that is connected for movement with the rack, and an outer tie rod that is connected for movement with the steering knuckle. The inner and outer tie rods are connected with each other in a known manner to form a tie rod assembly. The length of the tie rod assembly is adjustable, to enable adjustment of vehicle toe.

If the vehicle engages a roadway curb at a high enough rate of speed, or if a curb push-off is attempted, force is transmitted from the steerable wheel back through the steering linkage to the steering gear. The steering gear can be damaged is sufficient force is transmitted.

To prevent such damage, it is known to provide a tie rod assembly with a predetermined weakened portion. The predetermined weakened portion is designed to buckle, or deform, at a force level lower than the amount of force that would damage the steering gear itself.

U.S. Pat. No. 6,234,704 discloses a ball stud having a buckle portion designed to buckle under an appropriate amount of longitudinal pressure. The buckle portion is formed by a rolling process resulting in furrowed portions and raised portions integrally formed in an accordion shape along a portion of the ball stud.

It is also known to form, on a cylindrical steering link, a reduced diameter cylindrical portion of the link. The reduced diameter portion, because it has a narrower cross-section than the remainder of the link, forms a predetermined weakened portion, or buckle portion, of the steering link.

SUMMARY OF THE INVENTION

The present invention is a vehicle steering linkage member comprising a socket, and a stud having a ball end portion received in the socket and supported for pivotal movement relative to the socket. The stud has a longitudinal axis, with a shank portion projecting from the socket and centered on the axis. The shank portion of the ball stud includes a predetermined weakened portion. The predetermined weakened portion buckles under a predetermined amount of force.

In a preferred embodiment, the predetermined weakened portion has a cross-sectional configuration that is not centered on the axis. The shank portion has a circular cross-sectional configuration centered on the axis and the predetermined weakened portion has a circular cross-sectional configuration that is not centered on the axis.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic illustration of a portion of a vehicle steering assembly including a rack and pinion steering gear and a linkage member in accordance with the present invention;

FIG. 2 is an enlarged view of a portion of the linkage member of FIG. 1;

FIG. 2 is a further enlarged view of a buckle portion of the linkage member of FIG. 1; and FIG. 4 is a sectional view through the buckle portion of FIG. 3, taken along line 4—4 of FIG. 3.

DETAILED DESCRIPTION OF THE INVENTION

The present invention relates to a vehicle steering linkage member having a portion that is designed to buckle under a predetermined axial load, to prevent damage to the vehicle steering gear. The present invention is applicable to various steering linkage constructions. As representative of the present invention, FIG. 1 illustrates a linkage member 10 that is incorporated in a vehicle steering linkage 12.

The linkage 12 is connected with a fluid power assisted rack and pinion steering gear 14. It should be understood that the present invention is applicable to steering linkage that is used with different types of steering gear.

The steering gear 14 includes a housing 16, a pinion 18, and a rack 20. The rack extends longitudinally through the housing 16. The housing 16 partially defines a fluid chamber in which is located a piston (not shown) fixed to the rack 20. The rack 20 is supported for axial movement relative to the housing 16. Upon rotation of the vehicle steering wheel 22, fluid under pressure is directed against the piston, causing the rack 20 to move within the housing 16 in a direction parallel to a steering axis 24. Axial movement of the rack 20 moves the steering linkage 12 connected to the ends of the rack.

The vehicle steering linkage 12 (FIGS. 1 and 2) includes a tie rod assembly 30 that extends between and interconnects one end of the rack 20 and a steering knuckle, a portion of which is shown at 32. The steering knuckle 32 is connected with a steerable wheel (not shown) of the vehicle. Thus, when the steering gear 14 is actuated, the tie rod assembly 30 transmits force from the rack 20 to the steering knuckle 32 to effect steering movement of the steerable wheel.

The tie rod assembly 30 includes an inner tie rod 40 and an outer tie rod 60. The inner tie rod 40 includes a socket 42 and also includes the linkage member 10, which is formed as a ball stud. The socket 42 has a threaded end portion 44 that is screwed into the rack 20. The socket 42 is thus fixed for movement with the rack 20. The socket 42 defines a pivot center 46 for the ball stud 10.

The ball stud 10 is preferably made as one piece from a single, homogeneous piece of material, such as carbon steel. The ball stud 10 may be formed by cold heading and heat treating of a steel rod.

The ball stud 10 has a ball end portion 48 and a shank portion 50. The ball end portion 48 of the ball stud 10 is received in the socket. The ball end portion 48 of the ball stud 10 supports the ball stud on the rack 20 for pivotal movement relative to the rack about the pivot center 46.

The ball stud 10 has a longitudinal axis 52 that extends through the center of the ball end portion 48 and through the pivot center 46 of the socket 42. The ball stud axis 52 may be coincident with the steering axis 24, as shown in FIG. 1, or may be skewed relative to the steering axis when the tie rod assembly 30 is moved relative to the rack 20 about the pivot center 46. The shank portion 50 of the ball stud 10 extends from the ball end portion 48. The shank portion 50 has a cylindrical, rod-shaped configuration centered on the axis 52. The shank portion 50 has a threaded outer end portion 54, opposite the ball end portion 48.

The outer tie rod 60 has an outer end portion 62 that is formed as a ball joint for connection with the steering knuckle 32. The ball joint 62 has a pivot center 64 for the outer tie rod 60. An inner end portion 66 of the outer tie rod 60 is formed as an internally threaded sleeve. The externally threaded end portion 54 of the ball stud 10 is screwed into the internally threaded end portion 66 of the outer tie rod 60, to secure the two pieces together. A jam nut 68 on the outer tie rod 60 locks the two pieces together.

The tie rod assembly 26 thus extends between the rack 20 and the steering knuckle 32. The tie rod assembly 26 interconnects the rack 20 and the steering knuckle 32 in a force-transmitting relationship. The length of the tie rod assembly 26 is adjustable by loosening the jam nut 68, rotating the ball stud 10 of the inner tie rod 40 relative to the socket 42 and to the outer tie rod 60, and retightening the jam nut.

The shank portion 50 of the ball stud 10 has a substantially uniform diameter along its length, centered on the axis 52. However, the shank portion 50 may not be perfectly straight along its entire length, primarily because of the heat-treating process applied during manufacture of the ball stud 10. Thus, there may be sections along the length of the shank portion 50 of the ball stud 10 that are "bent" off the axis 52, that is, not perfectly centered on the axis.

If sufficient compressive force is applied along the axis 52 of the ball stud 10, as may occur during use of the vehicle as discussed above, the shank portion 50 will tend to buckle. This buckling will occur at the section along the axis 52 where the shank portion 50 is farthest from being centered on the axis, that is, where it is most "bent" off the axis 52.

It is desirable to control the location of buckling of the shank portion 50, that is, to ensure that it buckles, if at all, at a predetermined location along its length. In addition, it is desirable to control the amount of force needed to make the ball stud 10 buckle.

To this end, the shank portion of the ball stud 10 is provided with a predetermined weakened portion, or buckle portion 70 (also known as a "fuse"). Preferably, the buckle portion 70 of the ball stud 10 is located at about the axial center (from end to end) of the tie rod assembly 26. The buckle portion 70 is provided in an area of the shank portion 50 that has a circular cross-sectional configuration, with a cylindrical outer surface 71.

The buckle portion 70 is formed by creating an elongate groove 72, or relief area, on the shank portion 50 of the ball stud 10. This groove 72 may be formed in a manner similar to turning a work piece on a lathe. The buckle portion in the illustrated embodiment thus has a circular cross-sectional configuration, with a cylindrical outer surface 74.

The axis 52 of the ball stud 40 extends through the buckle portion 70. The cylindrical outer surface 74 of the buckle portion 70 is not, however, centered on the axis. Rather, the cylindrical outer surface 74 of the buckle portion 70 is centered on a relief centerline 76 that is spaced apart from the axis 52. The relief centerline 76, in the illustrated embodiment, extends parallel to the axis 52. As a result, the buckle portion 70 (and the outer surface 74) are eccentric to the axis 52. The buckle portion 70 thus constitutes a section of the shank portion 50 of the ball stud 10 that is intentionally "bent" off the axis 52.

The amount of eccentricity that is provided for the buckle portion 70 is empirically determined on the basis of measurements of typical manufactured ball studs 10. Specifically, a statistically large enough number of ball studs 10 are measured to determine the largest eccentricity of their shank portions 50, that is, the maximum amount of "bending" observed in the shank portions of the studs as manufactured. This maximum amount of bending is deemed to be the greatest amount of eccentricity that will be found in any similar manufactured ball stud 10.

Each one of the ball studs 10 that is manufactured in this way is then provided with a buckle portion 70 having an amount of eccentricity that is larger than the largest amount of eccentricity observed in the measured group of ball studs.

As a result, the buckle portions 70 of these manufactured ball studs 10 will be the portions of the ball studs that are most likely to buckle under axial compressive load. The ball studs 10 will buckle at the buckle portions 70, as opposed to at some other location along the length of the ball studs, because of the increased eccentricity of the buckle portions.

Therefore, when ball studs like the ball stud 10 are incorporated into tie rod assemblies like the tie rod assembly 26, the tie rod assemblies will buckle at their buckle portions 70, rather than elsewhere along the length of the tie rod assemblies.

In addition, the amount of force needed to buckle the ball stud 10 is dependent on the amount of eccentricity at the buckle portion 70. Because each single ball stud 10 manufactured in this way with this buckle portion 70 has the same amount of eccentricity at the buckle portion, each one of the ball studs will buckle under the same, predetermined, applied load. Therefore, the buckling characteristics of the tie rod assembly 26 are known in advance-location, and amount of force.

In one ball stud 10 constructed in accordance with the invention, the shank portion 50 of the ball stud has a diameter of 15.5 millimeters. The buckle portion 70 has a diameter of 12.5 millimeters. The buckle portion is eccentric by about 0.15 to 0.3 millimeters.

The invention is applicable to linkage members, such as ball studs, having different dimensions. Such linkage members typically have a shank portion with a diameter in the range of from about 12 millimeters to about 21 millimeters, although the diameter could be different. The buckle portion of such a ball stud may have a diameter in the range of from about 8 millimeters to about 18 millimeters. The buckle portion may be eccentric by about 0.1 to 0.5 millimeters, or more. The buckle portion may be eccentric by an amount equal to about 1% to about 5% of the diameter of said shank portion.

From the foregoing description of the invention, those skilled in the art will perceive improvements, changes and modifications in the invention. For example, the invention is not limited to forming a buckle portion on a cylindrical rod, but is usable also with rods (shank portions of ball studs) having non-cylindrical configurations. Such improvements, changes and modifications within the skill of the art are intended to be covered by the appended claims.

Having described the invention, I claim:

1. A vehicle linkage member comprising:
    a socket; and
    a stud having a ball end portion received in said socket and supported for pivotal movement relative to said socket, said stud having a longitudinal axis, said stud having a shank portion projecting from said socket and centered on said axis;
    said shank portion of said ball stud including a predetermined weakened portion, said predetermined weakened portion having a cross-sectional configuration that is not centered on said axis, said predetermined weakened portion being substantially linear and having one of a circular and an elliptical substantially uniform cross-sectional configuration.

2. A linkage member as set forth in claim 1 wherein said shank portion of said ball stud has a circular cross-sectional configuration centered on said axis and said predetermined weakened portion has a circular cross-sectional configuration that is eccentric to said axis.

3. A linkage member as set forth in claim 1 wherein said predetermined weakened portion buckles under a predetermined amount of force.

4. A linkage member comprising:
   a shank extending axially along a first axis, said shank having a first portion with a first outer surface that extends entirely around a circumference of said shank and is centered on said first axis;
   said shank including a narrowed second portion at a predetermined location along said first axis, said narrowed second portion having a cross-sectional area less than a cross-sectional area of said first portion, said shank adapted to buckle at said narrowed second portion under a predetermined axial load,
   said narrowed second portion of said shank including a second outer surface that is located entirely within a projection of said cross-sectional area of said first portion, said narrowed second portion being centered on a second axis that is offset relative to said first axis said narrowed second portion being substantially linear and having one of a circular and an elliptical substantially uniform cross-sectional configuration, wherein said first outer surface is cylindrical, said entire second outer surface being located radially inwardly, relative to said first axis, of said first outer surface, and wherein said narrowed second portion of said shank includes first and second opposite ends, a first annular tapered surface connecting said first outer surface to said second outer surface at said first end of said narrowed second portion and a second annular tapered surface connecting said first outer surface to said second outer surface at said second end of said narrowed second portion, said first and second annular tapered surfaces being asymmetric about said first axis.

5. The linkage member of claim 4 wherein said shank has a first circular cross-section and said narrowed portion has a second circular cross-section that is non-concentric with said first circular cross-section.

6. The linkage member of claim 4 wherein said second axis extends parallel to said first axis.

7. The linkage member of claim 6 said narrowed second portion of said shank extends straight along said second axis and parallel to said first axis.

8. The linkage member of claim 6 wherein said first and second axes are linear and are parallel to each other.

9. A linkage member comprising:
   a shank having opposite ends and extending axially along a first linear axis, said shank having a first portion with a first linear axis, said first portion with a first cylindrical outer surface that is centered on said first linear axis;
   said shank including a narrowed second portion at a predetermined location intermediate said ends of said shank along said first linear axis, said narrowed second portion having a cross-sectional area less than a cross-sectional area of said first portion, said shank adapted to buckle at said narrowed second portion under a predetermined axial load,
   said narrowed second portion of said shank including one of a second cylindrical and an elliptical outer surface that is centered on a second linear axis that is offset relative to said first linear axis and extends parallel to said first linear axis.

10. The linkage member of claim 9 wherein said entire second cylindrical outer surface is located radially inwardly, relative to said first cylindrical linear axis, of said first outer surface.

11. The linkage member of claim 10 wherein said narrowed second portion of said shank includes first and second opposite ends, a first annular tapered surface connecting said first outer surface to said second outer surface at said first end of said narrowed second portion and a second annular tapered surface connecting said first outer surface to said second outer surface at said second end of said narrowed second portion, said first and second annular tapered surfaces being asymmetric about said first linear axis.

12. The linkage member of claim 10 wherein said shank has a first circular cross-section and said narrowed portion has a second circular cross-section that is non-concentric with said first circular cross-section.

13. The linkage member of claim 9 wherein said narrowed second portion of said shank extends straight along said second linear axis and parallel to said first linear axis.

14. A linkage member comprising:
   a shank having first and second portions, said first portion having opposite first and second ends and extending axially along a first axis, said first portion having a first cross-sectional area that is centered on said first axis, said first cross-sectional area having a first cross-sectional shape;
   said second portion of said shank being located intermediate said first and second ends of said first portion, said shank adapted to buckle at said second portion under a predetermined axial load, said second portion of said shank having a second cross-sectional area that is smaller than said first cross-sectional area, said second cross-sectional area being centered on a second axis that is offset relative to said first axis, said second cross-sectional area also having said first cross-sectional shape;
   first and second transition portions connecting said second portion of said shank to said first and second ends of the first portion, respectively, each of said first and second transition portions having an outer surface that extends axially, when measured along said first axis, over a first distance on a first side of said first axis and over a second distance, different from said first distance, on a second side of said first axis, opposite said first side.

15. The linkage member of claim 14 wherein said first and second portions of said shank are cylindrical and said first cross-sectional shape is circular.

16. The linkage member of claim 14 wherein said first and second axes are linear and are parallel to each other.

17. The linkage member of claim 14 wherein said outer surface of each said first and second transition portions tapers radially inwardly, relative to said first axis, from said first portion of said shank to said second portion of said shank.

\* \* \* \* \*